(12) United States Patent
Lee et al.

(10) Patent No.: US 8,300,184 B2
(45) Date of Patent: Oct. 30, 2012

(54) COLOR FILTER SUBSTRATE

(75) Inventors: Keon Woo Lee, Daejeon (KR); Sang Kyu Kwak, Daejeon (KR); Jong Hwi Hwang, Daejeon (KR); Beom Su Park, Daejeon (KR); Chang Ho Cho, Gyeonggi-do (KR); Sung Hyun Kim, Daejeon (KR); Seung Hee Lee, Seoul (KR); Bog Ki Hong, Daejeon (KR); Dong Kung Oh, Daejeon (KR); Chang Soon Lee, Daejeon (KR); Kyoung Hoon Min, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/448,879

(22) PCT Filed: Nov. 5, 2008

(86) PCT No.: PCT/KR2008/006518
§ 371 (c)(1),
(2), (4) Date: Oct. 8, 2009

(87) PCT Pub. No.: WO2009/066886
PCT Pub. Date: May 28, 2009

(65) Prior Publication Data
US 2010/0245732 A1    Sep. 30, 2010

(30) Foreign Application Priority Data
Nov. 20, 2007  (KR) .................. 10-2007-0118283

(51) Int. Cl.
*G02F 1/1335* (2006.01)

(52) U.S. Cl. ............................................. 349/106
(58) Field of Classification Search ................ None
See application file for complete search history.

(56) References Cited

U.S. PATENT DOCUMENTS

| | | | |
|---|---|---|---|
| 6,094,247 A | 7/2000 | Miyazaki et al. | |
| 6,226,061 B1 * | 5/2001 | Tagusa | 349/84 |
| 6,271,902 B1 * | 8/2001 | Ogura et al. | 349/106 |
| 2002/0008813 A1 * | 1/2002 | Miyakawa et al. | 349/106 |
| 2010/0103355 A1 * | 4/2010 | Sakamoto et al. | 349/106 |

FOREIGN PATENT DOCUMENTS

| | | |
|---|---|---|
| JP | 05-232309 | 9/1993 |
| JP | 09-145916 | 6/1997 |
| JP | 09-304615 | 11/1997 |
| JP | 2001-330721 | 11/2001 |
| JP | 2005-024920 | 1/2005 |
| JP | 2005-031563 | 2/2005 |
| KR | 10-0138025 B1 | 2/1998 |
| KR | 10-1999-0048091 A | 7/1999 |
| KR | 10-2001-0049941 A | 6/2001 |

OTHER PUBLICATIONS

Machine translation of the abstract of JP 04-109221.*

* cited by examiner

*Primary Examiner* — Lucy Chien
(74) *Attorney, Agent, or Firm* — McKenna Long & Aldridge LLP

(57) ABSTRACT

A color filter substrate is provided. In the color filter substrate, transparent protective films are formed on respective sub-pixels of a color filter. The color filter substrate has improved electric field characteristics without the need for additional optical or circuit compensation to achieve an improvement in contrast and a reduction in color difference.

9 Claims, 1 Drawing Sheet

COLOR FILTER SUBSTRATE

This application claims the benefit of PCT/KR2008/006518 filed on Nov. 5, 2008, and Korean Patent Application No. 10-2007-0118283 filed on Nov. 20, 2007, both of which are hereby incorporated herein by reference for all purposes in their entirety.

TECHNICAL FIELD

The present invention relates to a color filter substrate in which transparent protective films are formed on respective sub-pixels of a color filter.

BACKGROUND ART

A typical liquid crystal cell of a flat panel display device such as a liquid crystal display device consists essentially of a thin film transistor substrate for driving the display device, a color filter for displaying colors, and a liquid crystal therebetween. The color filter is a substrate in which a pattern is formed using a photosensitive organic material containing a pigment dispersion by photolithography and pixels are formed using three or more kinds of color inks having different transmission-absorption wavelengths. To create sharp and natural images in the liquid crystal display device, the color filter is required to have a high contrast and a minimum color difference.

The use of a black matrix is necessary to divide the pixels in the production of the color filter. However, the largest problem encountered in the formation of the black matrix pattern and the pixels is that a stepped portion is formed at the boundaries between the pixels, as illustrated in FIG. 2. The stepped portion gives rise to a difference in distance between the color filter and the thin film transistor in the liquid crystal cell, and as a result, an electric field applied is distorted, which causes a decrease in contrast and an increase in color difference.

To overcome such disadvantages, additional processing is needed. For example, an optical compensation film is formed for the purpose of preventing a decrease in contrast. Further, upon occurrence of a color difference, an additional step can be taken to compensate circuit signals. However, these additional processing steps are responsible for high production cost of the liquid crystal display device.

As an attempt to reduce the height of the stepped portion, a transparent organic thin film 100 is formed over the entire surface of the color filter, as illustrated in FIG. 3. However, the surface area of the color filter covered with the thin film is so large that impurities tend to adhere to the thin film, leading to an increase in the number of defects. Accordingly, an extremely high degree of cleanliness is needed to exclude impurities from the color filter. Further, the intended effect of the thin film is not as satisfactory as expected.

Thus, there is an urgent need to provide a color filter substrate that achieves a high contrast and a minimum color difference without the need for additional processing and extreme production conditions.

DISCLOSURE OF INVENTION

Technical Problem

It is an object of the present invention to provide a color filter substrate with high contrast and reduced color difference.

Technical Solution

In accordance with an aspect of the present invention, there is provided a color filter substrate comprising a color filter and transparent protective films formed on respective sub-pixels as color filter layers of the color filter wherein the difference in height between the highest point of each of the transparent protective films and a reference plane defined as the highest level of the corresponding color filter layer is not greater than 0.1 μm.

In a preferred embodiment, the edges of the transparent protective film may be below the reference plane.

In a preferred embodiment, the edges of the transparent protective film are positioned at secondary inflection points of the color filter layer.

In a preferred embodiment, the transparent protective film has a transmittance of 85% or higher.

In a preferred embodiment, the color filter substrate may further comprise a transparent electrode layer formed on the transparent protective film.

In a preferred embodiment, the color filter substrate may further comprise a liquid crystal alignment layer on the transparent electrode layer.

In accordance with another aspect of the present invention, there is provided a liquid crystal display device comprising the color filter substrate.

ADVANTAGEOUS EFFECTS

The color filter substrate of the present invention has improved electric field characteristics without the need for additional processing or optical or circuit compensation to achieve an improvement in contrast and a reduction in color difference.

BEST MODE FOR CARRYING OUT THE INVENTION

Preferred embodiments of the present invention will now be described in greater detail.

The present invention provides a color filter substrate comprising a color filter and transparent protective films formed on respective sub-pixels as color filter layers of the color filter.

The highest point of each of the transparent protective films substantially lies in the same plane as a reference plane defined as the highest level of the corresponding color filter layer. In a preferred embodiment, the highest point of the transparent protective film is positioned at the central portion in the same plane as the reference plane of the color filter layer. The central portion of the transparent protective film does not necessarily lie in the same plane as the reference plane, and its position may be varied such that the difference in height between the highest point of the transparent protective film and the reference plane of the color filter layer is not greater than 0.1 μM, taking into consideration an error range in the formation of the transparent protective film.

The edges of the transparent protective film are positioned so as not to exceed the reference plane of the color filter layer.

The height of the transparent protective film is adjusted below the reference plane so that impurities are prevented from adhering to the transparent protective film. This configuration decreases the number of defects, resulting in an increase in productivity. In addition, the need for additional processing, such as the compensation of circuit signals or the formation of an additional optical compensation film is eliminated, resulting in a redaction in production cost.

Figure 1:
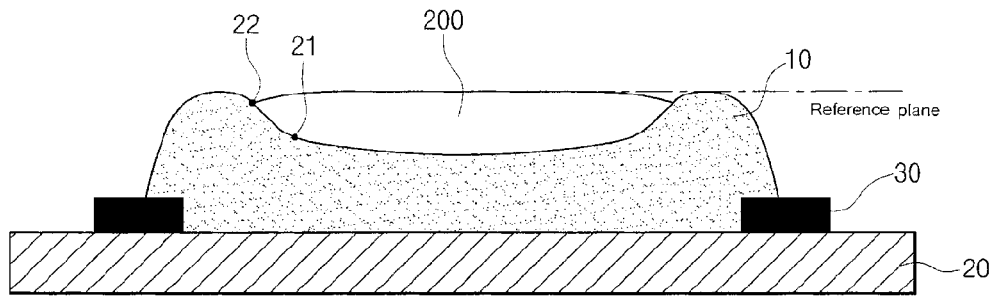
FIG. 1 illustrates a color filter substrate according to an embodiment of the present invention.
Figure 2:
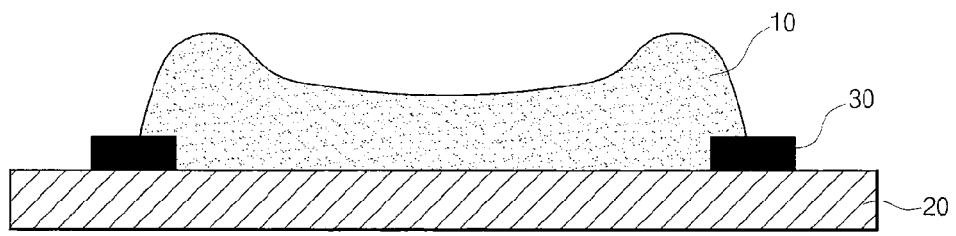
FIGS. 2 and 3 illustrate prior art color filter substrates.
Figure 3:
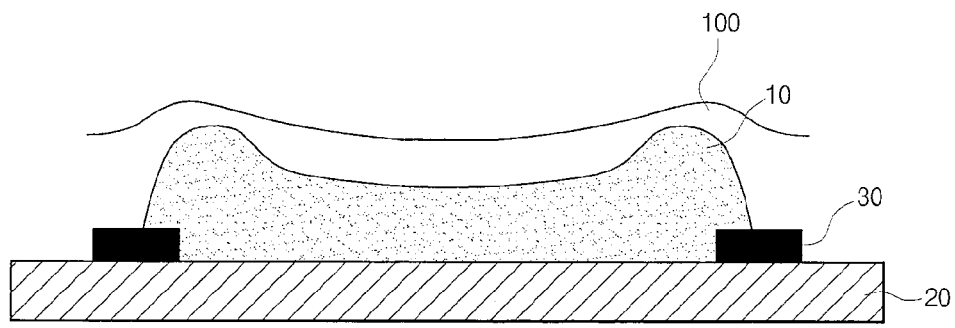

FIG. 1 illustrates a color filter substrate according to an embodiment of the present invention. As illustrated in FIG. 1, the color filter substrate comprises a color filter layer 10, a transparent protective film 200, and a black matrix 30. The color filter layer 10 has primary inflection points 21 and secondary inflection points 22.

In a preferred embodiment, edges of the transparent protective film are positioned at the secondary inflection points 22. If the central portion of the transparent protective film is above or below the reference plane of the color filter layer, the alignment of the liquid crystal is disordered due to the difference in the thickness of the central portion and the edges of the transparent protective film, and as a result, desired effects of the transparent protective film cannot be achieved. Meanwhile, if the edges of the transparent protective film are above the reference plane of the color filter layer, impurities tend to adhere to the transparent protective film, leading to an increase in the number of defects. The intended effects of the transparent protective film can be achieved without the above-mentioned problems when the edges of the transparent protective film are positioned at the secondary inflection points below the reference plane and the central portion thereof is very close to the reference plane.

Any material that can be patterned by photolithography may be used to form the transparent protective film. For example, a negative type photosensitive resin composition is preferable as the material for the transparent protective film. The negative type photosensitive resin composition refers to a material that becomes insoluble in an alkaline developing solution when exposed to light and the unexposed portions only are developed with the developing solution. A patternable material having a transmittance of 85% or higher may be used without any particular limitation.

Instead of photolithography, inkjet printing or offset printing may also be used to pattern the material for the transparent protective film. In this case, the material for the transparent protective film is not necessarily limited to a photosensitive resin composition, and a thermally curable material may be used to form the transparent protective film so long as it has a transmittance of 85% or higher.

A transparent electrode layer may be formed on the transparent protective film. For example, when it is intended to apply the color filter substrate of the present invention to TN, STN, VA, MVA and SVA node liquid crystal displays other than IPS and S-IPS modes, an indium-tin oxide layer may be formed as the transparent electrode layer.

The transparent protective films of the color filter substrate according to the present invention are formed by photolithography in accordance with the following procedure.

a) A patternable material is applied to the color filter layers by a suitable coating process, such as spin coating, slit coating, dip coating or doctor blade coating, and pre-baked at 50 to 150° C. for 10 to 1,000 seconds to form an organic thin film layer.

b) The organic thin film layer is exposed through a photomask, and dipped in or sprayed with a developing solution. The regions of the organic thin film layer shielded by the photomask react with the developing solution. As a result of the development, the unexposed regions of the organic thin film layer are removed, leaving the exposed portions only on the color filter layers.

The light exposure can be performed using a suitable light source such as g-line (436 nm), h-line (405 nm), i-line (365 nm), j-line (313 nm) or a combination thereof in a suitable exposure system equipped with a mask aligner, a stepper, a scanner, etc. The exposure energy is determined depending on the sensitivity of the color filter layers and is typically from 10 to 200 $mJ/cm^2$. The organic thin film layer is not satisfactorily patterned at an exposure energy lower than 10 $mJ/cm^2$. Meanwhile, an exposure energy higher than 200 $mJ/cm^2$ increases the time required for the production of the color filter substrate and enlarges the pattern, making it difficult to form the protective films in a desired shape.

All types of photolithography known in the art can be used to form the transparent protective films. Inkjet and offset printing processes can also be applied to the formation of the transparent protective films.

The color filter substrate may further comprise liquid crystal alignment layers on the respective transparent electrode layers.

The present invention also provides a liquid crystal display device comprising the color filter substrate.

The high contrast and reduced color difference of the color filter substrate ensure good quality of the liquid crystal display device.

MODE FOR THE INVENTION

Hereinafter, the present invention will be explained in more detail with reference to the following examples. However, these examples are provided for the purpose of illustration and are not intended to limit the scope of the present invention.

EXAMPLES

Example 1

A negative type photoresist for a color filter (HCR3, LG Chemical (Korea)) was applied to a glass substrate, on which a black matrix (thickness=1 μm) had been already formed, by spin coating, pre-baked at 100° C. for 2 minutes, exposed under a high-pressure mercury lamp with an energy of 100 mJ/cm2 through a photomask, developed by spraying with 0.04% aqueous KOH at 25° C., washed with deionized water, dried by air blowing, and post-baked in a convection oven at 220° C. for 30 minutes to form color filter layers. Hollow portions (area=120 μm×40 μm) were formed on the respective color filter layers.

A material for transparent protective films was applied to the resulting structure by spin coating, pre-baked at 100° C. for 2 minutes, exposed under a high-pressure mercury lamp with an energy of 100 mJ/cm2 through a photomask, developed by spraying with 0.04% aqueous KOH at 25° C., washed with deionized water, dried by air blowing, and post-baked in a convection oven at 220° C. for 30 minutes. Each of the transparent protective films was found to have an area of 100 μm×30 μm.

The material for the transparent protective films was prepared by dissolving 8 parts by weight of BzMA/MAA (70/30 (mol/mol), Mw=24,000) as an alkali-soluble resin binder, 8 parts by weight of dipentaerythritol hexaacrylate as a polymerizable compound and 1 part by weight of Irgacure 369 (Ciba-Geigy) as a photopolymerization initiator in 81 parts by weight of PGMEA as an organic solvent using a shaker for 3 hours, and passing the solution through a 5 μm filter.

Comparative Example 1

The procedure of Example 1 was repeated except that the transparent protective films were not formed.

Comparative Example 2

The procedure of Example 1 was repeated except that the entire surface of the transparent protective film was exposed to light without using a mask.

Experimental Example 1

Measurement of Step Heights in Cross Section

The cross section profiles of the color filter substrates produced in Example 1 and Comparative Examples 1 and 2 were measured using a reflection type optical system (Nanoscan, NanoSystems Co., Ltd.). The results are shown in FIG. 4.

Figure 4:
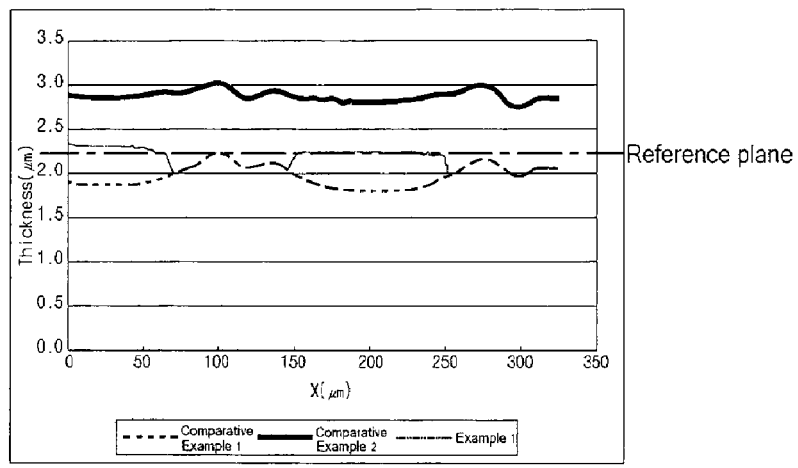
FIG. 4 illustrates the measurement of the cross section profiles of the color filter substrates produced in Example 1 and Comparative Examples 1-2.

The graph of FIG. 4 shows that the color filter substrate of Comparative Example 2 was slightly flatter than that of Comparative Example 1. The transparent protective film of the color filter substrate of Comparative Example 2 was measured to have a thickness of about 0.8-1.0 μm. In the color filter substrate of Example 1, the transparent protective films were formed on the plateau portions (i.e. hollow regions) of the respective color filter layers and had a thickness of about 0.4 μm, which is similar to the highest portions of the color filter layers.

Experimental Example 2

Contrast Measurement

Each of the color filter substrates produced in Example 1 and Comparative Examples 1 and 2 was pieced on a linearly polarized light source. The intensities of light passing through the color filter substrate were measured using a camera equipped with a CCD sensor while rotating a polarizing plate. The contrast of the color filter substrate was defined as a value obtained by dividing the maximum intensity by the minimum intensity.

TABLE 1

|  | Specimen No. | Contrast |
| --- | --- | --- |
| Example 1 | 1 | 1,604 |
|  | 2 | 1,618 |
|  | 3 | 1,627 |
| Comparative Example 1 | 1 | 801 |
|  | 2 | 804 |
|  | 3 | 789 |
| Comparative Example 2 | 1 | 1,236 |
|  | 2 | 1,247 |
|  | 3 | 1,229 |

As can be seen from Table 1, the color filter substrate of Example 1 had a higher contrast than the color filter substrates of Comparative Examples 1 and 2.

The invention claimed is:

1. A color filter substrate comprising
a color filter and
transparent protective films formed on respective sub-pixels as color filter layers of the color filter,
wherein the difference in height between the highest point of each of the transparent protective films and a reference plane defined as the highest level of the corresponding color filter layer is not greater than 0.1 μm, and
wherein the edges of the transparent protective film are below the reference plane.

2. The color filter substrate according to claim 1, wherein the edges of the transparent protective film are positioned at secondary inflection points of the color filter layer.

3. The color filter substrate according to claim 1, wherein the transparent protective film has a transmittance of 85% or higher.

4. The color filter substrate according to claim 1, further comprising a transparent electrode layer formed on the transparent protective film.

5. The color filter substrate according to claim 4, further comprising a liquid crystal alignment layer on the transparent electrode layer.

6. A liquid crystal display device comprising the color filter substrate according to claim 5.

7. The color filter substrate according to claim 1, further comprising a transparent electrode layer formed on the transparent protective film.

8. The color filter substrate according to claim 2, further comprising a transparent electrode layer formed on the transparent protective film.

9. The color filter substrate according to claim 3, further comprising a transparent electrode layer formed on the transparent protective film.

* * * * *